United States Patent [19]
Hilbert et al.

[11] Patent Number: 5,592,164
[45] Date of Patent: Jan. 7, 1997

[54] CIRCUIT ARRANGEMENT FOR SIGNAL PROCESSING

[75] Inventors: Stefan Hilbert, Zeuthen; Bernd Kirchner, Berlin, both of Germany

[73] Assignee: Deutsche Forschungsanstalt für Luft-und Raumfahrt, e.V., Köln, Germany

[21] Appl. No.: 265,434

[22] Filed: Jun. 24, 1994

[30] Foreign Application Priority Data

Jun. 24, 1993 [DE] Germany ............................ 43 21 621.8

[51] Int. Cl.$^6$ .................................................. H03M 1/00
[52] U.S. Cl. ......................... 341/120; 341/122; 341/118
[58] Field of Search ..................................... 341/118, 120, 341/155, 138, 139, 141, 163, 122; 348/213

[56] References Cited

U.S. PATENT DOCUMENTS

| | | | |
|---|---|---|---|
| 4,677,422 | 6/1987 | Naito | 340/347 |
| 4,896,155 | 1/1990 | Craiglow | 341/120 |

OTHER PUBLICATIONS

Data Sheet "Four–Channel 12–Bit sampling A/D converter for Digital Signal Processing" AD 1334, Data Acquisition Subsystem 7–21, Analog Devices.
Data Sheet "Small Signal Data Acquisition System" AD 79015 Data Acquisition Subsystems 7–49, Analog Devices.
Data Sheet "16–Channel Data Acquisition System" AD 1341 Data Acquisition Subsystems 7–25, Analog Devices.

Primary Examiner—Jeffrey A. Gaffin
Assistant Examiner—Peguy JeanPierre
Attorney, Agent, or Firm— Cohen, Pontani, Lieberman, Pavane

[57] ABSTRACT

A circuit arrangement for signal processing of discrete or continuous signals of at least one CCD component, includes a multiplexer which receives the signals for processing and has an output, a pre-amplifier having an input connected to the output of the multiplexer, and further having an output. Two sample and hold circuits are provided that each have an input connected to the output of the pre-amplifier, each of the sample and hold circuits further having an output. An operational amplifier is provided having a non-inverting input connected to the output of a first of the sample and hold circuits, and an inverting input connected to the output of a second of the sample and hold circuits, the operational amplifier further has an output. A digital-analog converter having an output connected to the non-inverting input of the operational amplifier and puts out a correction signal. A multiplying digital-analog converter is provided having a reference input connected to the output of the operational amplifier, the multiplying digital-analog converter further having an output. A third sample and hold circuit has an input connected to the output of the multiplying digital-analog converter, the third sample and hold circuit further having an output. A buffer has an input connected to the output of the third sample and hold circuit, and further has an output connected to the input of an analog-digital converter.

14 Claims, 2 Drawing Sheets

CIRCUIT ARRANGEMENT FOR SIGNAL PROCESSING

BACKGROUND OF THE INVENTION

1. Field of the Invention

The present invention relates to a hybrid integrated circuit arrangement for the signal processing of discrete or continuous signals and is applicable particularly to the processing of the signals of one or more CCD (charge coupled device) components.

A main area of application for the invention is aerial photography, wherein the signals of multiple CCD lines are corrected in real time and digitized.

2. Discussion of the Prior Art

Circuit arrangements for signal processing and analog/digital conversion are known. The circuits can carry out, in various combinations, the functions of multiplex signal processing, programmable amplification, internal voltage reference, sampling and holding before analog/digital conversion, analog/digital conversion and processor interface.

Thus, the data sheet entitled "Data Acquisition Subsystems AD 1334" of the company Analog Devices, Inc. describes a four-channel analog-digital converter for digital signal processing which is particularly suitable for use in sonar signal processing, machine control and vibration analysis.

The data sheets "Data Acquisition Subsystems AD 1341" and "AD 79015" describe data acquisition systems especially for use in motion control, speech processing, flight control and signal processing of extremely small signals, for example in biomedicine.

Furthermore, a circuit arrangement for signal processing of analog signals is described in U.S. Pat. No. 4,677,422. This circuit arrangement has a multiplexer that is connected from its output to the input of an amplifier. Two sample/hold circuits are connected to the output of the amplifier and an analog-digital converter. An effective time-correlated sampling of analog signals, particularly from CCD components, with subsequent differential formation is not possible with the construction of this patent.

A disadvantage in all the known solutions is the insufficient speed and the complexity of the circuit arrangement.

SUMMARY OF THE INVENTION

Accordingly, it is an object of the present invention to provide a circuit arrangement for signal processing which carries out a plurality of functions at a high processing speed and permits real-time signal correction, while requiring minimal space for the circuit arrangement and offering high reliability as well as an optimal signal-to-noise ratio.

It is a further object of the invention to design the circuit arrangement for flexible use in the most varied fields of application.

Pursuant to this object, and others which will become apparent hereafter, one aspect of the present invention resides in a circuit arrangement in which the signals for processing are sent to a multiplexer whose output is connected to the input of a preamplifier whose output is connected to the inputs of the sample and hold circuits. The output of the first sample and hold circuit is connected to the non-inverting input of an operational amplifier and the output of the second sample and hold circuit is connected to the inverting input of the operational amplifier. The non-inverting input of the operational amplifier is additionally connected to the output of a digital-analog converter, and is loaded with the correction signal of the digital-analog converter. The output of the operational amplifier is connected to the reference input of a further, multiplying digital-analog converter, whose output is connected to the input of a third sample and hold circuit. The output of the third sample and hold circuit is connected to the input of a buffer whose output is connected to the input of an analog-digital converter. This is implemented in a compact hybrid circuit that ensures high signal processing speed. By means of high integration density of the hybrid circuit, and of the ensuing low space requirement, reliability is increased, an optimum signal/noise ratio is achieved and a minimum weight and space requirement is provided.

In a further embodiment of the invention an internal voltage source is provided to deliver a reference voltage to the analog-digital converter and the digital-analog converter.

Still another embodiment provides all of the components to be arranged in a highly-integrated hybrid circuit that includes a plurality of modules which respectively have connections that lead out of the hybrid circuit. The modules are adapted so that they can be used in complete combination, in partial combination or as individual components.

All the important functions of the circuit arrangement are digitally controllable (digital signal processor interface) and capable of operating in real time.

A further advantage of the invention is that the hybrid-integrated circuit arrangement provides a multiplicity of possible uses. In addition to the main field of application, CCD signal processing, there are for example applications such as a PC interface circuit or in signal acquisition systems controlled by digital signal processors. In particular, the modularity, unusual for circuits of this class and resulting from the division into component blocks, and the appropriate lead-out of the respective connections, permits extremely flexible use.

The lead-out of numerous pins enables signal tracking and error search in terms of measurement technology. The sample and hold circuits may be switched off, so that signal scanning deviating from the correlated double sampling principle may be carried out.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

The embodiments discussed below describe CCD signal processing for three CCD lines, maintaining real time conditions.

Figure 1:
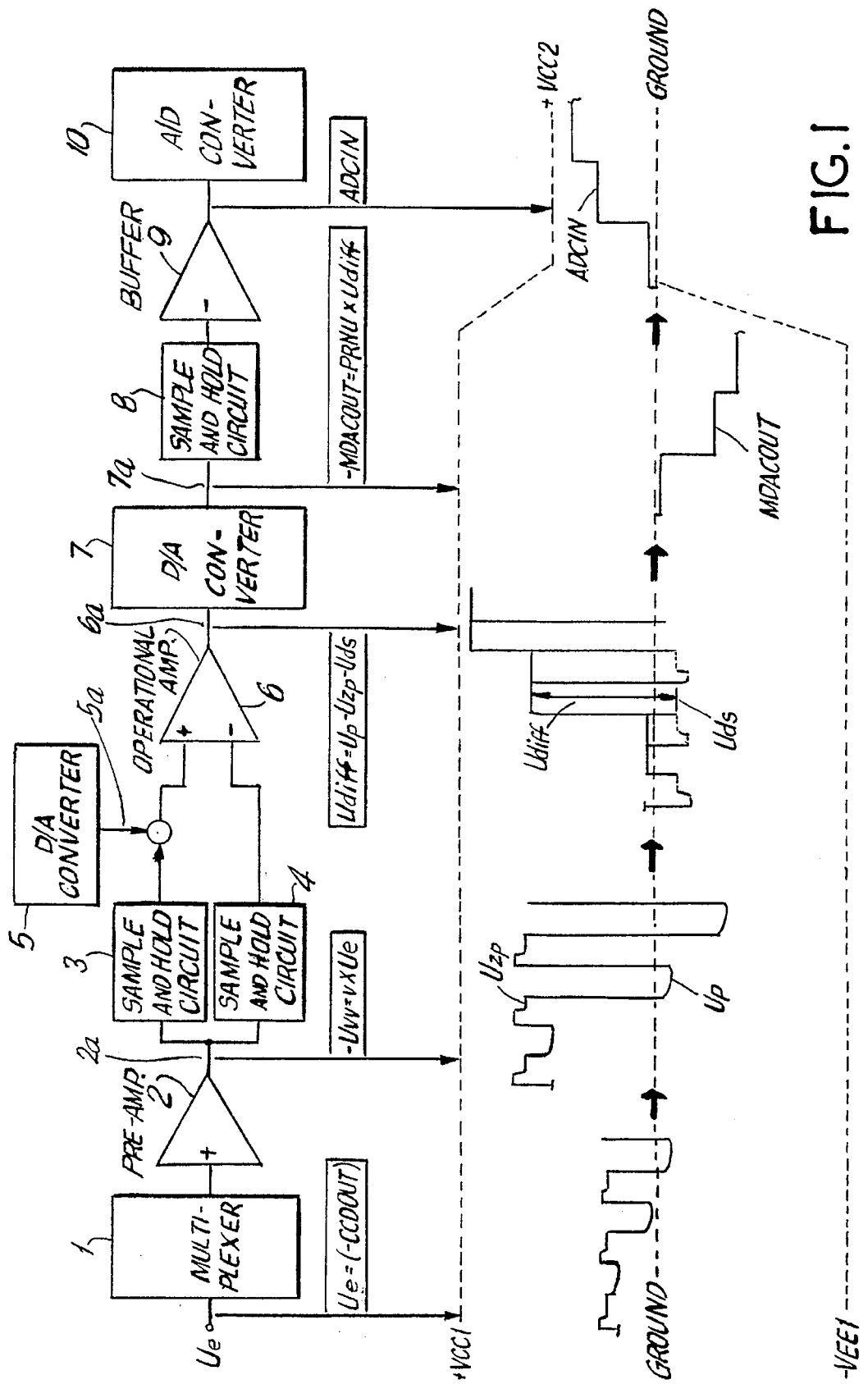
FIG. 1 is a circuit diagram of the circuit arrangement and the respective signal progress pursuant to the present invention.

As the functional illustration in FIG. 1 shows, a multiplexer 1 passes the signal of the CCD line to be read off to a pre-amplifier 2. The amplified CCD signal 2a (pixel/intermediate pixel) is sampled by the sample and hold circuits 3, 4 by appropriate timing (correlated double sampling). A DC voltage signal 5a calculated by an external digital signal processor, and containing the offset of the signal channel and the median dark current value of the CCD charge-coupled device, is fed through a digital-analog converter 5. In principle it is also possible to carry out this correction with reference to pixels (DNSU (dark signal non-uniformity) correction).

The signal 6a coming from an operational amplifier 6 is corrected in its amplification (PRNU photo responsive correction) by the formation of a differential free of dynamic-restricting signal components, the correction being pixel-referenced, in accordance with a table contained in an external RAM/ROM. The corrected signal 7a is sampled and held by a sample and hold circuit 8 in such a way that when amplified by a buffer 9 it is detected by an analog-digital converter 10 and converted from analog to digital.

Figure 2:
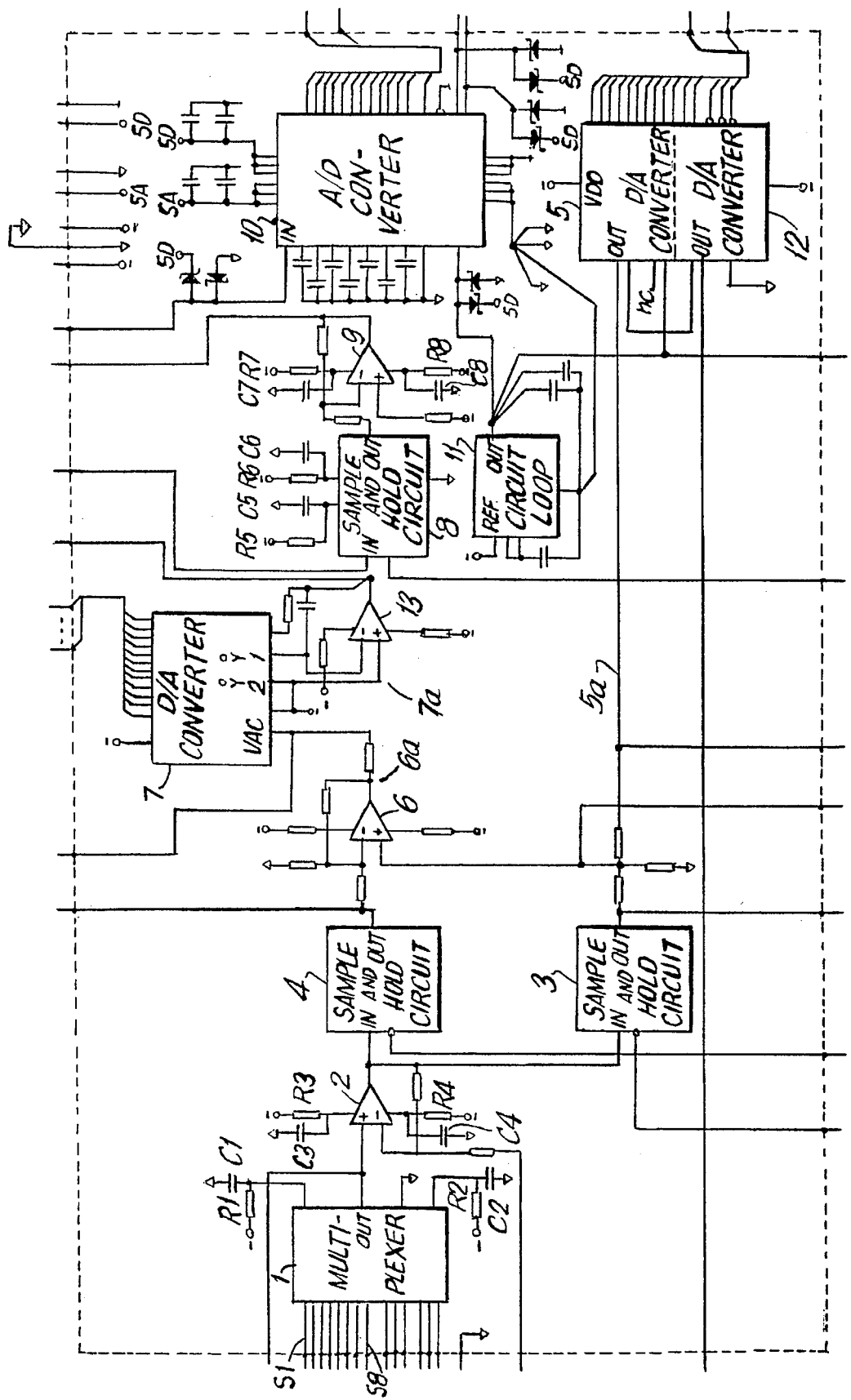
FIG. 2 is a detailed circuit arrangement of the hybrid circuit loop.

A concrete example of the circuit arrangement of the hybrid circuit loop is shown in FIG. 2. The following description represents an overview of FIGS. 1 and 2.

The signals S1 . . . S8 to be processed are passed to the multiplexer 1. The output of the multiplexer 1 is connected to the non-inverting input of the operational pre-amplifier 2, the inverting input of the operational amplifier 2 is connected optionally through a pre-resistance externally to ground or to another reference potential. The output of the operational amplifier 2 is connected to the inputs of the sample and hold circuits 3, 4. The outputs of the sample and hold circuits 3, 4 are connected via weighted resistor combinations with the operational amplifier 6. The output of the first sample and hold circuit 3 is connected to the non-inverting input of the operational amplifier 6, and the output of the second sample and hold circuit 4 is connected to the inverting input of the operational amplifier 6. By means of appropriate timing of the sample and hold circuits 3,4, there is obtained at the output of the operational amplifier 6 a potential-free differential signal 6a, e.g. the pixel value of a CCD output. A timed synchronous or DC signal from the output of the digital-analog converter 5 is passed to the inverting input of the operational amplifier 6 through a pre-resistor for the purposes of additive offset and drift correction. It should be noted that, as a result of continuous updating of this correction signal 5a formed by the digital-analog converter 5 by evaluating the signals of the analog-digital converter 10 via an externally subsequent digital signal processor, a regulation loop can be formed.

The output of the operational amplifier 6 is connected directly to the reference input of the multiplying digital-analog converter 7, which multiplies the signal 6a delivered by the operational amplifier 6 by the digital value applied in a timed synchronous fashion at its digital inputs, thus undertaking an alteration in amplification or multiplicative correction of the signal to be processed. The current signal 7a delivered by the output of the digital-analog converter 7 is passed to the non-inverting input of an operational amplifier 13, which is set up as a current/voltage converter. The output of the operational amplifier 13, is again available as a signal voltage. The signal delivered by the operational amplifier 13 is passed to the input of the third sample and hold circuit 8.

The output of the sample and hold circuit 8 delivers a signal which is passed by means of the operational amplifier 9, incorporated as a buffer, to the input of the analog-digital converter 10, which converts the applied analog signal into a digital value. A reference circuit loop 11 delivers the internal reference voltage for the digital-analog converter 5, the analog-digital converter 10 and a digital-analog converter 12. The freely programmable digital-analog converter 12 is integrated for testing or similar purposes.

The outputs of the multiplexer 1, the sample and hold circuit 4, the digital-analog converter 5, the operational amplifier 6, the buffer 9, the digital-analog converter 12, and the operational amplifier 13, as well as the inputs of the sample and hold circuit 8 and of the analog-digital converter 10, are led out of a casing of the hybrid circuit loop as pins, in order to effect signal tracking for testing and monitoring purposes, and to enable a modular structure of the circuit arrangement.

Disturbance-free voltage supply to the sensitive components is ensured by internal RD filters or support condensers. Thus the multiplexer 1 is connected to RC resistance-capacitive low-pass members (R 1/C 1 and R 2/C 2), the pre-amplifier is connected to RC low-pass members (R3/C 3 and R 4/C 4), the sample and hold circuit to RC low-pass members (R 5/C 5 and R 6/C 6), and the buffer 9 to RC low-pass members (R 7/C 7 and R 8/C 8), and thus decoupled from the operational voltage. Also, by means of high-speed diodes, the analog-digital converter 10 has an excess-voltage and latchup protection.

The invention is not limited by the embodiments described above which are presented as examples only but can be modified in various ways within the scope of protection defined by the appended patent claims.

We claim:

1. A circuit arrangement for signal processing of discrete or continuous signals of at least one CCD component, comprising: a multiplexer which receives the signals for processing and has an output; a pre-amplifier having an input connected to the output of the multiplexer, and further having an output; two sample and hold circuits each having an input connected to the output of the pre-amplifier, each of the sample and hold circuits further having an output; an operational amplifier having a non-inverting input connected to the output of a first of the sample and hold circuits and an inverting input connected to the output of a second of the sample and hold circuits, the operational amplifier further having an output; a digital-analog converter having an output connected to the non-inverting input of the operational amplifier and putting out a correction signal to the operational amplifier a multiplying digital-analog converter having a reference input connected to the output of the operational amplifier, the multiplying digital-analog converter further having an output; a third sample and hold circuit having an input connected to the output of the multiplying digital-analog converter, the third sample and hold circuit further having an output; a buffer having an input connected to the output of the third sample and hold circuit, the buffer further having an output; and an analog-digital converter having an input connected to the output of the buffer.

2. A circuit arrangement according to claim 1, and further comprising an internal voltage source adapted to deliver a reference voltage to the analog-digital converter and the digital-analog converter.

3. A circuit arrangement according to claim 2, and further comprising a second, digital analog converter connected to the internal voltage source.

4. A circuit arrangement according to claim 3, wherein the second digital-analog converter is adapted to be a test generator.

5. A circuit arrangement according to claim 1, and further comprising first RC low-pass members connected to the multiplexer, second RC low-pass members connected to the pre-amplifier, third RC low-pass members connected to the third sample and hold circuit, and fourth RC low-pass members connected to the buffer, so as to be decoupled from an operational voltage.

6. A circuit arrangement according to claim 1, and further comprising a second operational amplifier connected between the output of the multiplying digital-analog converter and the input of the third sample and hold circuit as an I/U converter.

7. A circuit arrangement according to claim 1, wherein the multiplexer, the pre-amplifier, the three sample and hold circuits, the operational amplifier, the digital-analog converter, the multiplying digital-analog converter, the buffer and the analog-digital converter are disposed in a highly integrated hybrid circuit.

8. A circuit arrangement according to claim 7, wherein the hybrid circuit includes a plurality of modules in a highly modular fashion, the modules respectively having connections that lead separately out of the hybrid circuit.

9. A circuit arrangement according to claim 8, wherein the modules are adapted so as to be usable in a total combination, in a partial combination and as individual components.

10. A circuit arrangement according to claim 7, and further comprising external processor means coupled to the hybrid circuit for at least one of correcting at least one of a digital-analog converter output signal and an operational amplifier output signal, and generating signal process pulses.

11. A circuit arrangement according to claim 1, wherein the digital-analog converter puts out a direct current line-reference correction signal that contains an offset of a signal channel and a median dark current value of a CCD line.

12. A circuit arrangement according to claim 1, wherein the digital-analog converter puts out a direct current pixel-referenced correction signal that contains an offset of a signal channel and a dark current value of a pixel.

13. A circuit arrangement according to claim 1, and further comprising high-speed diodes connected to the analog-digital converter for overvoltage and latchup protection.

14. A circuit arrangement as defined in claim 1, wherein the circuit arrangement is adapted for real-time processing of signals of a CCD image-taking system.

* * * * *